United States Patent [19]

Cherón

[11] 4,243,731

[45] Jan. 6, 1981

[54] METHOD AND DEVICE FOR FEEDING A FUEL CELL WITH FLUID REACTANTS

[75] Inventor: Jacques Cherón, Maisons-Laffitte, France

[73] Assignee: Institut Francais du Petrole, Rueil-Malmaison, France

[21] Appl. No.: 97,277

[22] Filed: Nov. 26, 1979

[30] Foreign Application Priority Data

Nov. 24, 1978 [FR] France .................. 78 33505

[51] Int. Cl.³ ............................................ H01M 8/06
[52] U.S. Cl. ............................... 429/13; 429/22; 429/34
[58] Field of Search ............ 429/13, 22, 25, 34, 429/38

[56] References Cited

U.S. PATENT DOCUMENTS 3,553,026  1/1971  Winsel ............................. 429/13
3,589,941  2/1969  Eaton et al. ..................... 429/22
3,615,842  10/1968 Craft et al. ...................... 429/22

FOREIGN PATENT DOCUMENTS 1486405  6/1967  France ........................... 429/22

Primary Examiner—Donald L. Walton
Attorney, Agent, or Firm—Millen & White

[57] ABSTRACT

A method for feeding with the same fluid different chambers of a fuel cell block, each of these chambers being connected to a fluid feed pipe and to a fluid discharge pipe, the fluid flow rate admitted into each chamber being limited by flow rate control means, this method comprising the step of scavenging with fluid at least one chamber, once or periodically during the operation of the pipe, by passing during a limited time interval, the flow regulation means associated to this chamber.

10 Claims, 8 Drawing Figures

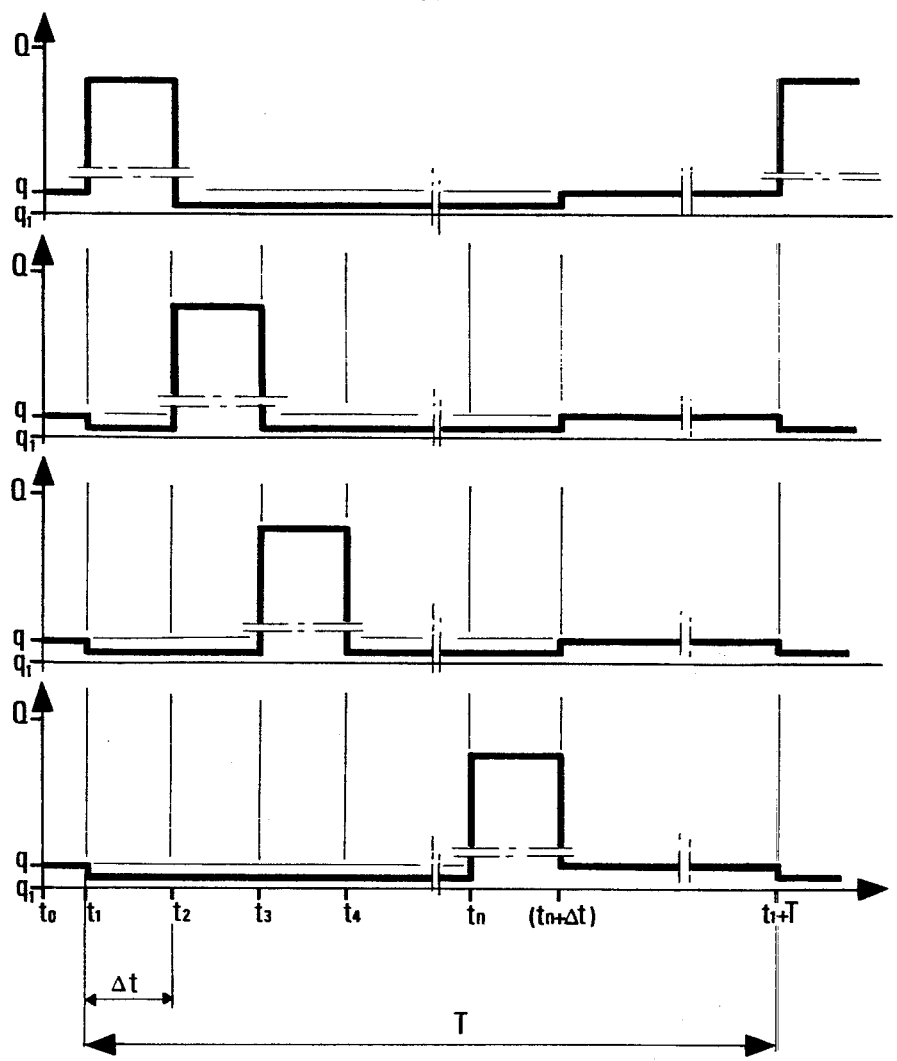
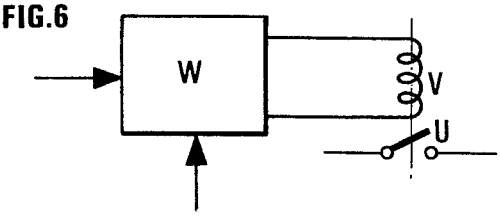

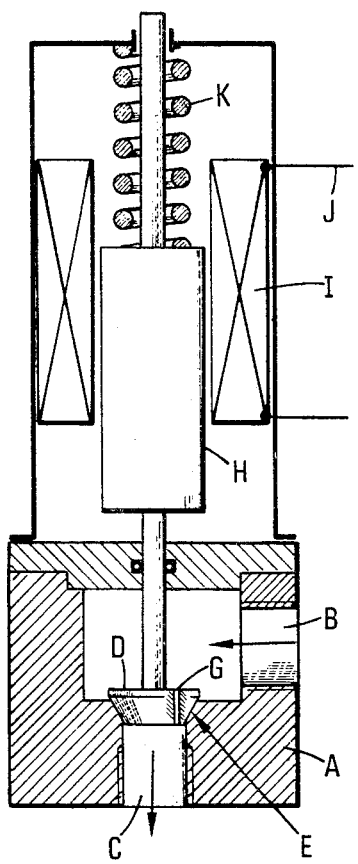
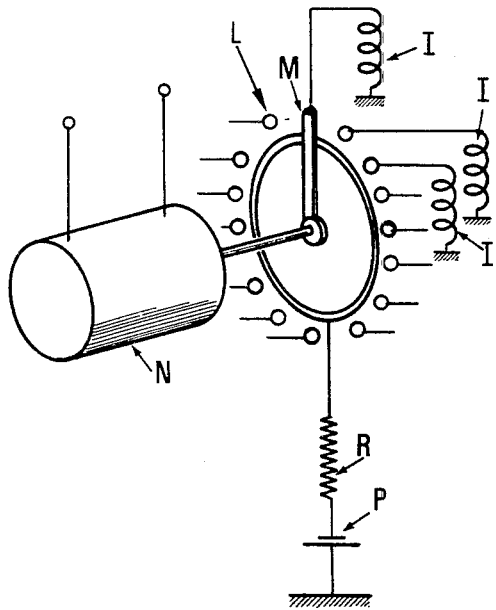
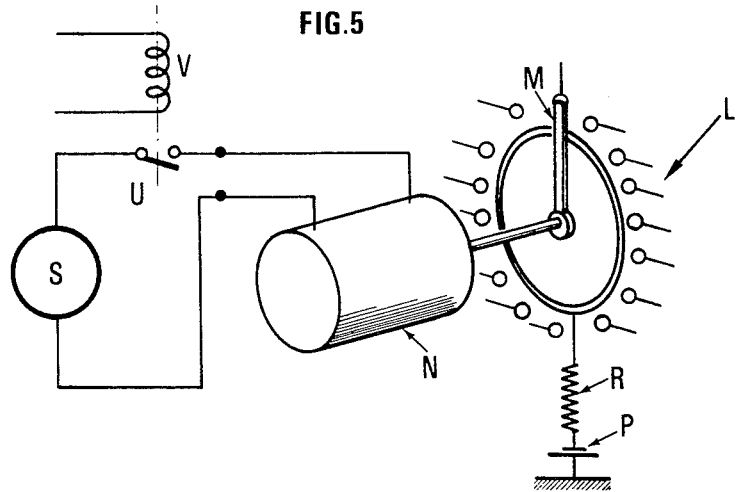

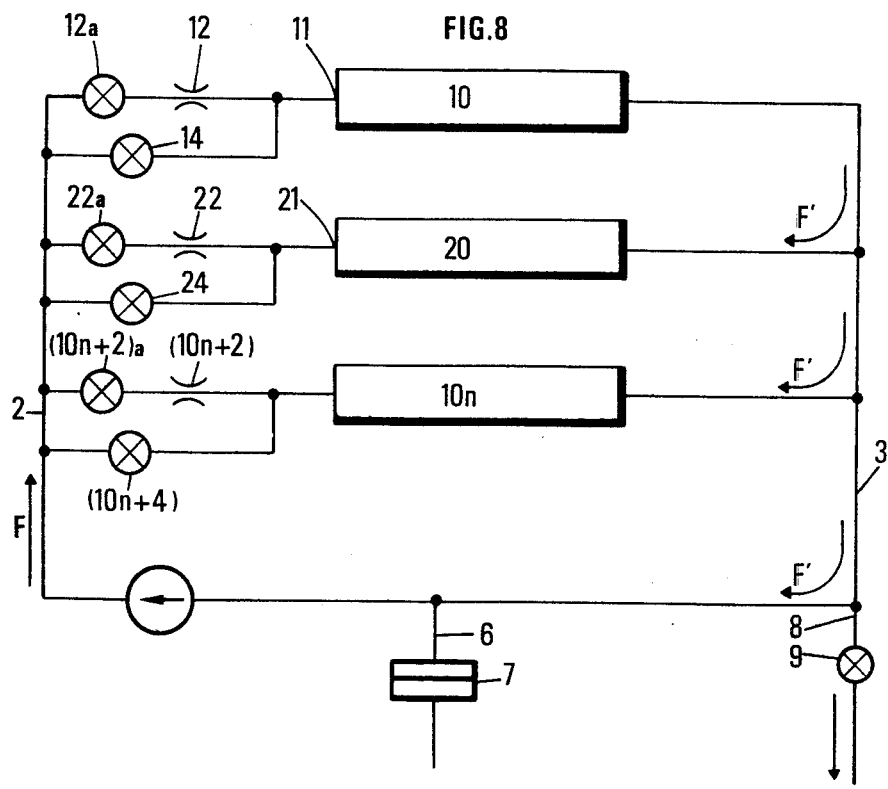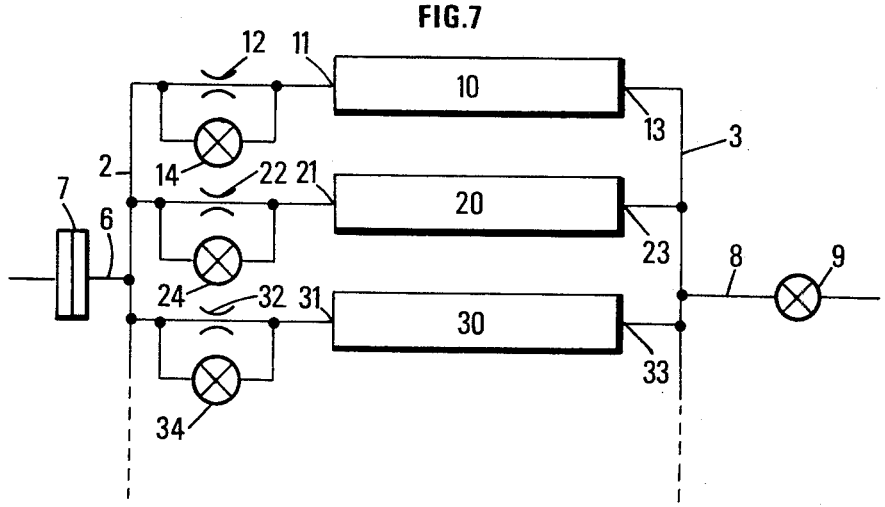

METHOD AND DEVICE FOR FEEDING A FUEL CELL WITH FLUID REACTANTS

BACKGROUND OF THE INVENTION

The present invention relates to a method for feeding a fuel cell with fluid products such as reactants, or liquid electrolyte, and to a device for carrying out this method.

A fuel cell comprises chambers fed with the fluid products necessary to its operation, which are supplied by feeding circuits.

For a better understanding of the following description reference will be made, by way of example only, to a fuel cell comprising:
  chambers supplied with a gaseous fuel such as hydrogen,
  chambers supplied with a combustion sustaining gas or oxidizer, such as air, and
  chambers fed with a liquid electrolyte such as an aqueous solution of potassium hydroxide.

Mainly two methods are used for feeding with the same fluid a plurality of fuel cell chambers.

According to the first of these methods, all the fuel cell chambers are connected in series. Since the fluid reactants are not very pure, it can be ascertained that the impurity content increases from the first to the last chamber traversed by these fluids. Consequently the electrodes which limit these chambers are not under the same operating conditions. This disadvantage can be limited by feeding the chamber with a fluid at a flow rate whose value greatly exceeds that corresponding to the fluid consumption of the fuel cell. This feeding at a high flow rate may either be continuous or intermittent, as in the embodiment shown in FIG. 1 of French Patent No. 1,486,405. In any case this method requires in the feeding circuit of the fuel cell the provision of means for supplying, at least periodically, fluid at high flow rate under a pressure sufficient to compensate for the pressure drops in each fuel cell chamber. Such means has a high power consumption and thus decreases the overall efficiency of the fuel cell.

According to the second method which may be illustrated by FIG. 2 of the above-indicated French Patent all the chambers are connected in parallel to obtain a theoretical pressure drop of reduced value.

Unfortunately, it is difficult with such an arrangement to balance the fluid flow rates in the different chambers. It has been experimentally ascertained that since the fluid flow rates are not the same in the different chambers the impurity content varies from one chamber to another and thus the electrodes limiting these adjacent chambers do not operate under the same conditions. This drawback can be limited by using a fluid distributor located between the feeding circuit and the different chambers. This distributor is for example constituted by capillary conduits connected in series with the chambers or may be designed as illustrated in U.S. Pat. No. 3,589,941. To compensate for the pressure drops through these capillary conduits, it is necessary to use feeding means capable to deliver a pressurized fluid at a high flow rate. The power required to actuate such feeding means substantially reduces the output of the fuel cell.

According to other proposed solutions combining the two above-indicated methods, and illustrated by FIG. 3 of French Pat. No. 1,486,405, the chambers fed with the same fluid are distributed into groups which are interconnected either in series or in parallel, the chambers of each group also being interconnected either in parallel or in series. These solutions also require a high power consumption to circulate the fluid flow through the feeding circuit.

In any event the fluid flow rate through the feeding circuit must be substantially greater than the fluid consumption rate of the fuel cell, so as to limit the concentration of impurities in the chambers.

It has become possible to maintain the impurity content in the fuel cell substantially at a constant value, irrespective of the fluid flow rate feeding the fuel cell, with an average fluid flow rate through the feeding circuit which is about twice the consumption rate of the fuel cell. This has been achieved by designing a feeding circuit comprising a pipe forming a loop which interconnects the inlet and outlet orifices of the fuel cell, fresh fluid being continuously admitted into this loop and a certain fraction of the fluid flowing through the loop being permanently or periodically discharged therefrom.

Nevertheless the power consumed for the fluid circulation reduces the net output of the fuel cell.

Moreover a precise observation of a fluid flow through a fuel cell chamber of given geometry shows that the impurity content is highly variable from a given location of this chamber to another and may sometimes reach such a value that considerable portions of the electrode no longer take part in the production of electric power. This phenomenon is obviously dependent on the shape and size of the chambers and on the relative location of the inlet and outlet orifices for the fluid reactant in these chambers.

It is also known from U.S. Pat. No. 3,268,364 to increase the flow rate of fluid feeding the fuel cell and from U.S. Pat. No. 1,359,881 to use an auxiliary fluid to sweep away water gathered in some of the fuel cell chambers. Such method requires a substantial power consumption for circulating these fluids.

OBJECTS OF THE INVENTION

The main object of the present invention is accordingly to obviate or at least greatly reduce the above-indicated drawbacks.

More precisely the invention provides a method for feeding the chambers of a fuel cell which requires a lower power consumption than the methods used up to now.

Another object of the invention is to feed the chambers of a fuel cell in a manner which reduces as much as possible the variations of the impurity content in a chamber of a given geometry.

SUMMARY OF THE INVENTION

The above objects are attained by periodically scavenging at least one of the fuel cell chambers with a fluid at a flow rate higher than the consumption rate in said chamber, this scavenging fluid flow rate being in some cases substantially equal to the overall fluid flow rate through the circuit feeding all the chambers, this scavenging step being cyclically repeated for each chamber.

BRIEF DESCRIPTION OF THE DRAWINGS

The invention will become more readily apparent and its advantages set forth by the description of non-limitative particular embodiments, illustrated by the accompanying drawings wherein:

FIG. 2 shows versus time the values of the flow rate through the compartments,

FIG. 3 shows an embodiment of a valve-distributor assembly,

FIGS. 4 to 6 illustrate means for controlling the valves, and

FIGS. 7 and 8 show alternative embodiments of the invention.

DETAILED DISCUSSION

Figure 1:
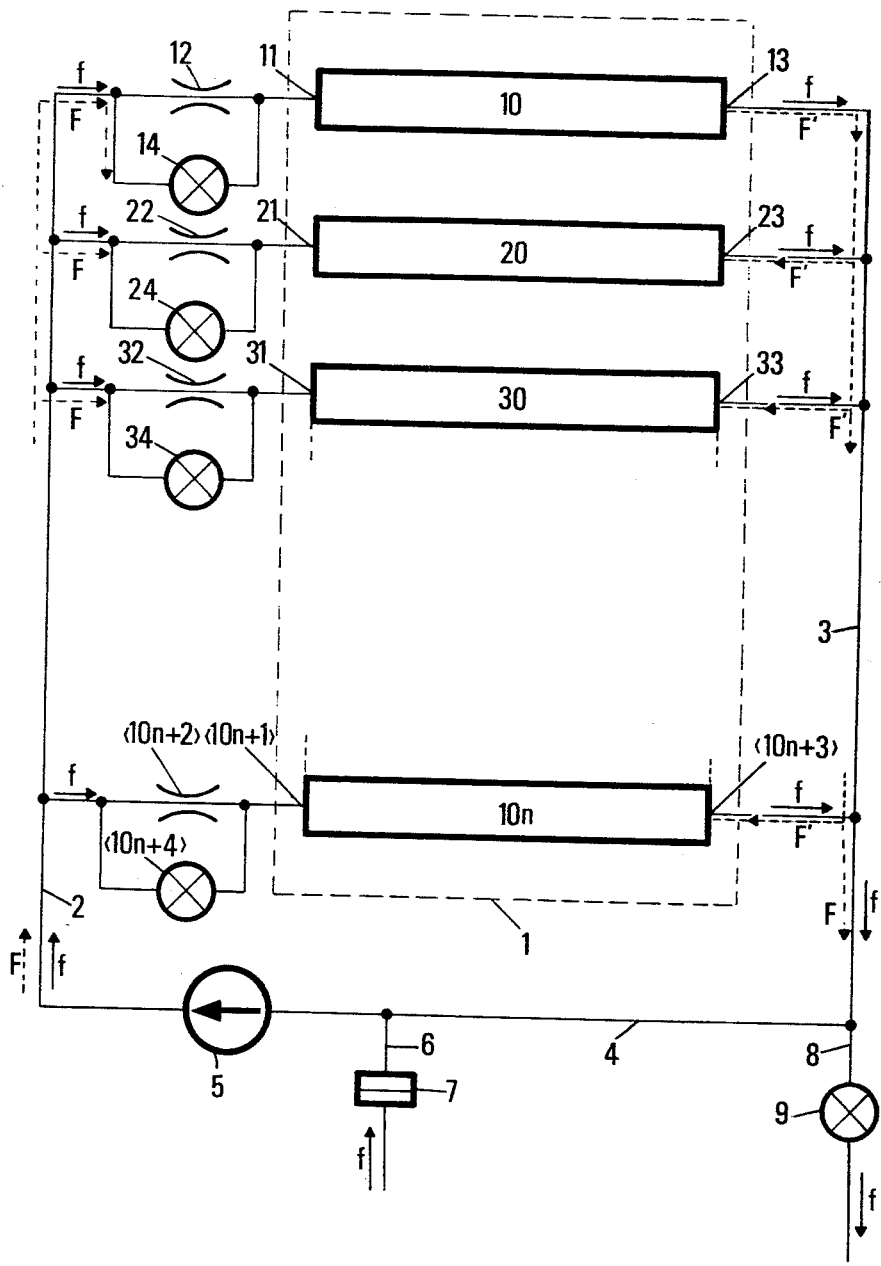
FIG. 1 diagrammatically illustrates a device according to the invention.

In FIG. 1, reference numeral 1 designates a fuel cell block which is diagrammatically shown and may be of any known type. For example, but not limitatively, the electrodes (not shown) delimit in this fuel cell block, chambers fed with fluid fuel, chambers fed with a combustion-sustaining fluid and chambers fed with an electrolyte through suitable feeding circuits.

For a clear understanding of the following description the n chambers of the fuel cell block which are fed with a fluid fuel such as hydrogen have been diagrammatically shown under the references 10, 20, 30 . . . 10n.

The feeding circuit comprises a feeding pipe 2 to which the inlet orifices 11, 21, 31 . . . (10n+1) of the different chambers are connected through regulating means 12, 22, 32 . . . (10n+2) creating determined pressure drops, so as to balance the fluid flow rates through the different chambers. These pressure drops may be for example produced by calibrated conduits or by any other suitable known means. The outlet orifices 13, 23, 33 . . . (10n+3) of the chambers are connected to a discharge pipe 3. A recycling pipe 4 interconnects pipes 2 and 3 so as to form a closed loop feeding circuit. Means such as a blower 5 circulates the fuel through this feeding loop.

The fuel is introduced into the loop under constant pressure through a pipe 6 connected to the outlet of a pressure-reducer 7 which is itself fed with fuel from a fuel source (not shown). At least a fraction of the fluid flowing through the loop can be withdrawn, either continuously or periodically by means of a discharge pipe 8 optionally provided with a flow regulator such as a valve 9. Opening of this valve can be effected in known manner in dependence with the operating conditions of the fuel cell so as to limit the average content of impurities in the feeding circuit. For example, but not limitatively, this valve may be actuated as indicated in French Pat. No. 2,325,204.

According to the invention, each inlet orifice 11, 21, 31 . . . (10n+1) of a chamber is directly connected to the feeding circuit 2 through a by-pass circuit avoiding the passage through the regulator 12, 22, 32 . . . (10n+2).

The different by-pass circuits are diagrammatically shown as valves 14, 24, 34 . . . (10n+4) having an open and a closed position, and connected in parallel with the regulators 12, 22, 32 . . . (10n+2). These valves are, for example, electrically actuated, as described below.

The use of a flow distributor creating pressure drops between the pipe 2 and the inlets 11, 21, 31 . . . (10n+1) of the chambers has been described above only by way of example. It would be possible, without departing from the scope of the invention, to use a flow distributor creating pressure drops between the outlets 13, 23 . . . (10n+3) of the chambers and the discharge pipe 3, or also a distributor creating pressure drops both at the inlet and at the outlet of the chambers provided that in all cases suitable circuits by-pass at least partly these distributors.

The operation will be described below assuming first that all the valves are closed at the initial time $t_o$ (FIG. 2). The fuel feeding the fuel cell block flows in the direction indicated by the arrows f. The chambers 10, 20, 30 . . . 10n are fed through the distributors 12, 22, 32 . . . (10n+2). They receive fluid at a substantially identical flow rate q, such that n.q=Q, n being the number of chambers fed with fluid and Q the flow rate of this fluid in the feed loop. In each chamber the fluid consumption rate of the electro-chemical reaction is $q_1$.

The flow rate Q has been so selected that the ratio $q=Q/n$ is greater than $q_1$.

During the operation of the fuel cell, the content of impurities in the feed loop increases and the impurities gather within the chambers, so that the impurity content in one chamber increases until reaching such a value that substantial portions of the electrodes no longer take part in the production of electrical power. This results in a decrease of the fuel cell output. For example at the instant $t_1$ there is observed a decrease in the electric voltage at the terminals of the fuel cell elements which do not work under the initial conditions.

It is then necessary to purge the chambers of their impurities so as to restore the performance of the fuel cell. Such purging may be achieved by scavenging with a fluid at a flow rate much greater than $q_1$.

To this end the valve 14 is opened at instant $t_1$ while the other valves remain closed. The opening of the valve 14 thus causes a reduction of the pressure drop in the circuit feeding the chamber 10 which is then scavenged by fluid at a flow rate q' greater than the flow rate q previously feeding this chamber.

This flow rate q' is mainly dependent on the pressure in the feeding pipe 2, on the reduction of the pressure drop in flow rate of the fluid feeding the chamber 10, as a result of the opening of the valve 14, on the values of the pressure drops through 22, 32 . . . (10n+2), on the pressure in the chambers 10, 20, 30 . . . 10n, etc. Thus, the lower the pressure drop created by the valve 14, with respect to the pressure drops created by the capillary conduits 22 . . . (10n+2), the higher the scavenging flow rate q' will be. Simultaneously the chambers 20 to (10n+2) receive a fluid at a flow rate substantially equal to $q'_1$ as defined by the relationship:

$$(n-1)q'_1 = Q - q'$$

The value of $q'_1$ is always at least equal to $q_1$ and smaller than the above defined value Q.

In the open position of the valve 14 the chambers 20, 30 . . . 10n are fed automatically through the capillary conduits 22, 32 . . . (10n+2), as indicated by the arrows F in dotted line and/or through the apertures 23, 33 . . . (10n+3), as indicated by the arrows F' when the fluid flow rate through the orifices 21, 31 . . . (10n+1) is smaller than the consumption rate $q_1$ in each chamber.

At the time $t_2 = t_1 + \Delta t$, when scavenging of the chamber 10 has swept away all the impurities gathered in this chamber, the valve 14 is closed and the valve 24 is opened. The chamber 20 is then scavenged by the fuel at a flow rate q' while the other chambers receive fluid at a flow rate $q'_1$. At the instant $t_3 = t_2 + \Delta t$ the valve 24 is closed and the valve 34 is opened. The same operation is performed successively for all the chambers and at the instant $[t_1 + (n+1)\Delta t]$ of closure of the last valve (10n+4) the fuel feeding circuit is again in the same state as at the instant $l_0$ when all the chambers are fed with fuel at a flow rate q through the regulator 12, 22, 32 ... (10n+2) and the performances of the fuel cell are substantially the same as initially.

The operation of the fuel cell continues until time $t_1+T$ corresponding, for example, to a reduction of the performances of the fuel cell. A new scavenging cycle of the different chambers is then effected.

In the above-described process closure of a valve occurs at the opening time of another valve, as shown in FIG. 2.

According to an alternative embodiment (not shown) the opening of a valve is effected, a short time before the closure of the preceding valve but the concept of the invention is not affected. It is also possible, although it is not illustrated, to open a valve after closure of the preceding valve.

According to further embodiments valves with progressive opening and/or closure may be used. Moreover if the fluid flow rate in the feeding circuit is sufficient, it is possible, according to the same concept, to simultaneously scavenge a plurality of chambers. For simpler control the opening time of each valve will be of constant value experimentally predetermined in dependence on the expected conditions of use of the fuel cell, and particularly on the fluid flow rate through the feeding circuit.

Control can be fully automated by using electrically-controlled valves or devices as illustrated in FIG. 3.

This device comprises a flap valve having a body member A provided with an inlet orifice B connected to pipe 2 (FIG. 1) and an outlet orifice C communicating with the fuel cell chamber fed therethrough. A flap D co-operates with a flap seat E provided in the body member A to put the orifices B and C into communication, when the flap does not rest on its seat E. A calibrated conduit G provided through the flap D provides a communication between the apertures B and C when the flap D rests on its seat E. This conduit forms the calibrated conduit through which the chamber is fed with fluid at the flow rate q.

The flap is integral with the core H of an electromagnet I which can be supplied with electric current through wires J. In the absence of control current, a gauged spring K maintains the core H in its position wherein the flap D is in abutment against its seat E.

The device being in the position shown in FIG. 3, the chamber of the fuel cell is fed with the minimum flow rate through the calibrated conduit G, which produces a determined pressure drop in the fluid flow.

When the electro-magnet H is energized, the core H is displaced towards the top of the figure and drives along the flap D, against the action of the spring K. Under these conditions the flow rate through the valve is maximum.

FIG. 4 diagrammatically shows an embodiment of an automatic control circuit for the assembly. This circuit comprises a rotatable contactor diagrammatically shown at L, whose slider M is rotated by a step-by-step motor N. In each of its positions, the slider M connects one of the electro-magnets I to an electric voltage source P through a resistor R.

In the alternative embodiment shown in FIG. 5, the rotary contactor M has a position wherein no electric current is supplied to the electromagnet I. The slider remains in this position as long as the motor is not energized. The motor is fed by a generator 5 through a relay U whose opening is delayed.

Thus when the coil V of the relay receives a control signal, the relay U is kept closed over a time interval sufficient to permit a complete revolution of the slider M.

Control of the coil V of the relay U may be either manual or automatic. For example, as shown in FIG. 6, an amplifier-comparator W delivers a control signal adapted to actuate the relay U when the intensity of a control signal applied to its input terminal is lower than a preselected value set on its second input terminal.

The measuring signal is representative of the operating conditions of the fuel cell. For example this signal may be constituted by the electrical voltage between the electric terminals of the fuel cell or one of the fuel cell elements, the supplied electric current or the electric power delivered by the fuel cell, etc. . . . .

It is also possible to periodically actuate the relay U independently of any measurement of the characteristics of operation of the fuel cell, for example by using a clock device which energizes the coil V at predetermined time intervals.

Obviously these embodiments of automatic control means have only been described by way of example without excluding any other embodiment comprising electric circuits which are conventional in the art.

FIG. 7 shows an alternative embodiment wherein the discharge pipe 3 is not connected to the feed pipe 2, thus eliminating the device 5.

In this alternative embodiment the fluid flow delivered under constant pressure to the feed pipe 2, is automatically established as a consequence of the lower pressure prevailing in the fuel cell, owing to the fluid consumption rate.

Modifications can be made without departing from the scope of the present invention. For example, when opening a valve such as the valve 14, it is possible to simultaneously interrupt any communication between the feed pipe 2 and the apertures of the chambers which are not scavenged by a fluid flow. This may for example be achieved by using auxiliary valves 12a, 22a . . . (10n+2)a, connected in series with the means 12, 22 . . . (10n+2) for creating pressure drops, as shown in FIG. 8.

Thus under normal operation of the fuel cell all the auxiliary valves are open. When the valve 14 is opened all the auxiliary valves are simultaneously closed. The chamber 10 is traversed by a maximum scavenging flow rate equal to the flow rate Q through the pipe 2. The chambers 20 to 10n are fed as indicated by the arrows F'.

Similarly, during the opening periods of the valves 22 . . . (10n+2) the auxiliary valves are held closed by control circuits whose realization is within the range of those skilled in the art and therefore need not be described here.

Although the above description refers, by way of example, to the application of the invention to the fuel supply of a fuel cell, it must be understood that the same method can be used for feeding a fuel cell with a combustion sustaining fluid, or with liquid electrolyte.

What is claimed is:

1. A method for feeding with the same fluid a plurality of chambers of a fuel cell block, each of these chambers communicating with a fluid feed pipe and with a fluid discharge pipe, the flow rate of the fluid admitted into each chamber being limited by flow rate control means, comprising at least one step of scavenging at least one chamber with fluid during the operation of the fuel cell, by-passing during a limited time interval the flow regulator associated with said at least one chamber.

2. A method according to claim 1, wherein said scavenging step is performed for each chamber successively.

3. A method according to claim 2, wherein said scavenging step is repeated for each chamber at constant time intervals.

4. A method according to claim 2, comprising measuring at least one parameter representing the operating conditions of the fuel cell and effecting said scavenging step for the different chambers successively when said measured parameter reaches a predetermined value.

5. A method according to one of claims 3 or 4, wherein the scavenging of one chamber begins at the end of the scavenging of another chamber.

6. A method according to one of claims 3 or 4, wherein scavenging of a chamber begins before scavenging of another chamber is completed.

7. A device for feeding with the same fluid a plurality of chambers of a fuel cell block, comprising a feed pipe and a discharge pipe for each chamber and flow rate control means by regulation of a pressure drop for each chamber, each said control means being connected in series with its respective chamber, said device further comprising means for temporarily by-passing the control means associated with each chamber. each 8. A device according to claim 7, wherein said means for temporarily by-passing the flow control means of each chamber is formed of a direct passage with reduced pressure drop which connects the feed pipe to said chamber, and a valve controlling the opening or closure of said passage.

9. A device according to claim 8, comprising means for controlling the opening or closure of each valve, means for detecting a parameter representing the operating conditions of the fuel cell, and means actuating said means controlling the opening or closure of the different valves when said parameter reaches a preselected value.

10. A device according to claim 7, comprising a recycling pipe connecting the outlet apertures of the chambers to the feed pipe and means for circulating fluid through this recycling pipe.

* * * * *